United States Patent Office 3,367,802
Patented Feb. 6, 1968

3,367,802
VANADIUM BRONZE FUEL CELL ELECTRODE
David R. Rhodes, Novato, Calif., assignor to Chevron Research Company, San Francisco, Calif., a corporation of Delaware
No Drawing. Filed Dec. 29, 1965, Ser. No. 517,451
3 Claims. (Cl. 136—120)

ABSTRACT OF THE DISCLOSURE

A fuel cell electrode comprising in combination as an electrocatalyst (a) vanadium bronze having a minor proportion of molybdenum trioxide and (b) platinum.

---

This invention concerns novel compositions which are used for fuel electrodes in fuel cells. More particularly, this invention concerns the combination of a vanadium oxide and a noble metal as a composition to be used for fuel electrodes in a fuel cell.

The numerous advantages of fuel cells as a source of electricity have been amply reported in both the scientific and patent literature. The possibility of directly providing electrical energy from a carbonaceous fuel is particularly attractive in many situations. One deterrent to the widespread use of fuel cells employing carbonaceous fuels is the need to use the extremely expensive and less available noble metals, particularly platinum, as the fuel electrode. There has been continued research in an effort to find a replacement for platinum or a means for reducing the amount of platinum required for the same amount of power supplied under a given set of conditions.

It has now been found that with a carbonaceous fuel, e.g., methanol, ethylene, etc., mixtures of platinum with "vanadium bronze" are useful as electrocatalysts in fuel electrodes, wherein for equivalent power reduced amounts of platinum are required under a given set of conditions.

The composition of the mixture will generally have from about 10 to 90 weight percent vanadium bronze and from 90 to 10 weight percent platinum, more usually about 25 to 75 weight percent vanadium bronze and from about 75 to 25 weight percent platinum.

The vanadium bronzes employed are a mixture of vanadium pentoxide and vanadium tetroxide having minor amounts of an alkali metal oxide as well as small amounts of molybdenum oxide to enhance acid stability. Excluding the presence of molybdenum for the moment, the formulas of the vanadium bronze will approximate the following simple formula:

$$M_aV_2O_5$$

wherein M is an alkali metal cation, generally of atomic number 3–19, e.g., lithium, potassium, sodium, and $a$ is a number in the range of from about 0.1 to 1.0, more usually in the range of about 0.3 to 0.9. While the formula of the vanadium bronzes may be more accurately formulated as:

$$mM_2O.nV_2O_4.pV_2O_5$$

wherein $m$, $n$ and $p$ are the mole ratios and M is as defined previously, to the degree that $m$ and $n$ are equal, the simpler formula may be used.

Generally, from about 2 to 10 weight percent, more usually from about 3 to 8 weight percent of molybdenum trioxide ($MoO_3$) is incorporated into the vanadium bronze.

Vanadium bronzes are well known in the literature and are reported in "Nonstoichiometric Compounds," Advances in Chemistry Series 39, American Chemical Society, J. Chem. Physics, 37 220–225 (1962); and J. Electrochem. Soc. 109 413–419 (1962).

The vanadium bronzes combined with molybdenum trioxide are readily prepared by a vacuum fusion technique. The metal oxides or carbonates are mixed together and the mixture heated to about 750° C. or higher in an inert container causing the mixture to melt. The melt is cooled to solidification and the heating and cooling process repeated a number of times. The solidified melt is powdered and extracted with mineral acid followed by boiling water. The extracted powder is isolated and dried and is then ready for use. For example, lithium carbonate, molybdenum trioxide and vanadium pentoxide in the desired ratios are dried at 66° C. and the mixture placed in a quartz tube. The tube is evacuated and slowly heated to a red heat (approximately 800° C.) causing the mixture to melt. The melt is then allowed to cool to crystallization followed by reheating. The cooling and melting technique is repeated every one-half hour for 4 hours. At the end of this time, the cooled mass is ground into small particles, placed in 1 N sulfuric acid and the solution heated to the boiling point. After boiling for approximately 48 hours, the supernatant liquid is poured off, the solid washed with 1 N sulfuric acid and then boiled with water, the solid isolated by filtration, washed again with water and dried.

When combining lithium oxide (as lithium carbonate), vanadium pentoxide and molybdenum trioxide in the following mole proportions: $6V_2O_5:Li_2CO_3:MoO_3$, and preparing the product as described above, the product was dark blue-black in appearance and analyzed as follows:

TABLE I

| | Wt. percent |
|---|---|
| $Li_2O$ | 0.2 |
| $V_2O_5$ | 87 |
| $V_2O_4$ | 8 |
| $MoO_3$ | 5 |

The platinum and vanadium bronze in the form of powders may now be mixed in the desired proportions and used to fabricate the fuel electrode. Various methods for preparing electrodes from powders are known in the art.

The fuel cell of this invention is employed with an acid electrolyte, e.g., sulfuric acid, and a counter electrode, usually an oxygen electrode or cathode. The oxygen electrode may use platinum or other convenient material to catalyze the reduction of $O_2$ to $OH^\ominus$.

The fuels used may be hydrogen or carbonaceous fuels, generally of from 1 to 3 carbon atoms, such as methanol, ethylene, propane, etc.; that is, aliphatic hydrocarbons and alcohols. With gases, a porous diffusion electrode is used, the gas diffusing through the electrode, so that the gas, the electrolyte and the fuel electrode surface are in close proximity. With a liquid fuel, e.g., methanol, the fuel may be introduced into the electrolyte.

In order to demonstrate the effectiveness of the compositions of this invention as materials for fuel electrodes, the lithium vanadium bronze prepared above was mixed in a 1:1 weight ratio with platinum powder and shaped into a pill by compression at 200,000 lbs./sq. in. in a hydraulic press. A platinum screen was placed in the center of the pill for better electrical conduction. Contact was made with the pill by means of a platinum wire welded to one point of the platinum screen.

The electrochemical tests were carried out in a three compartment electrolytic cell. The counter electrode compartment was separated from the working electrode compartment by means of a frited glass disk. The reference electrode compartment was separated from the working electrode compartment by means of a closed stopcock. This minimized diffusion but provided sufficient electrolytic conductance to allow potentials of the electrode versus the reference electrode to be measured. The reference electrode was a saturated Calomel electrode (SCE) which was maintained at room temperature. Polarization studies were carried out with a Wenking potentiostat. Potential sweeps were made with a potential sweep generator and the currents obtained were recorded on a Sargent MR recorder.

Voltage sweep studies were made by changing the potential of the working electrode in a linear manner from 0 volt to 1 volt and back to 0 volt at a sweep rate of 10 millivolts per second. Current voltage curves of the electrode in the absence of fuel were made by bubbling helium gas past the electrode for 10 minutes while the electrode was at open circuit. The electrode was then held for one minute at 0 volt versus SCE before beginning the triangular voltage sweep. Ethylene and propane curves were made in a similar manner except that fuel was continuously bubbled past the electrode. Methanol curves were obtained using the same waiting times as described above, but without bubbing gas past the electrode. The electrolyte was 1 N sulfuric acid, the temperature 80° C., and the electrode area 2.6 sq. centimeters. While this testing method in no wise optimizes catalyst performance, it does provide an accurate comparison between various materials as catalysts for the fuel electrode.

The following table indicates the net current (total current minus current obtained in absence of fuel) obtained using the various fuels, comparing platinum black and vanadium bronze catalyst with a platinum black and graphite catalyst. The results are reported at different potentials as against a standard Calomel electrode.

TABLE II

| | Fuel | | | | | |
|---|---|---|---|---|---|---|
| | Methanol | | Ethylene | | Propane | |
| | Anodic Current, ma. | | | | | |
| Potential, volt vs. SCE | 0.2 | 0.4 | 0.2 | 0.4 | 0.2 | 0.4 |
| Electrode: | | | | | | |
| Pt. black, vanadium bronze | 175 | 180 | 50 | 50 | 10 | 10 |
| Pt. black, graphite | 0 | 135 | 0 | 30 | 0 | 10 |

Using one molar methanol as fuel in 1 N sulfuric acid electrolyte at 80° C., and an electrode area of 0.7 sq. centimeters, the current obtained was determined at constant potentials, rather than the sweep used above. The contant potential experiments have the advantage of giving results which are otbained in nearly steady state conditions. Also, there is no charging current due to the charging or discharging of the electrode double layer. The following table indicates the currents obtained with methanol as fuel at various potentials using a vanadium bronze/graphite electrode, a platinum black/graphite electrode and a vanadium bronze/platinum black electrode.

TABLE II

| | Anodic current, ma. | | |
|---|---|---|---|
| Potential, volt vs. SCE | 0.2 | 0.3 | 0.4 |
| Electrode: | | | |
| Vanadium bronze, graphite | | | 0 |
| Platinum black, graphite | 8 | 19 | 30 |
| Vanadium bronze, platinum black | 15 | 26 | 37 |

From the above results, it is evident that one can use much less platinum and still obtain the same or higher anodic current. Since anodic current is an indication of the rate of reaction of the fuel, this means that significant dilution of the extremely expensive platinum with vanadium bronzes does not reduce the rate of reaction at the electrode. Evidently, much cheaper fuel cells can be produced, without loss in power.

As will be evident to those skilled in the art, various modifications on this invention can be made or followed, in the light of the foregoing disclosure and discussion, without departing from the spirit or scope of the disclosure or from the scope of the following claims.

I claim:
1. A fuel cell electrode containing as electrocatalyst a composition having:
(a) 10 to 90 weight percent of a combination of vanadium bronze of the formula:

$$M_a V_2 O_5$$

wherein M is an alkali metal cation of atomic number in the range of 3 to 19 and $a$ is a number in the range of 0.1 to 1.0 with molybdenum trioxide in from 2 to 10 weight percent based on said vanadium bronze; and
(b) respectively, 90 to 10 weight percent of platinum.

2. A fuel cell electrode according to claim 1, wherein in said formula M is lithium.

3. A fuel cell electrode according to claim 1, wherein the combination of vanadium bronze and molybdenum trioxide is present in from 25 to 75 weight percent and said platinum is present in, respectively, from 75 to 25 weight percent.

References Cited

UNITED STATES PATENTS 3,160,531  12/1964  Spindler _____ 136—120

OTHER REFERENCES

"The Electrochemistry of $V_2O_5$ in LiCl–KCL Eutectic Melt"—H. A. Laitinen and D. R. Rhodes, J. Elec. Chem. Soc., 109, p. 413–418 (1962).

ALLEN B. CURTIS, *Primary Examiner.*

WINSTON A. DOUGLAS, *Examiner.*

N. P. BULLOCH, C. F. LEFEVOUR,
*Assistant Examiners.*